United States Patent [19]

Lu et al.

[11] 4,444,931

[45] * Apr. 24, 1984

[54] POLYESTER BLENDS

[75] Inventors: Shau-Zou Lu, Whitehouse Station; Melvin Druin, West Orange, both of N.J.

[73] Assignee: Celanese Corporation, New York, N.Y.

[ * ] Notice: The portion of the term of this patent subsequent to Feb. 17, 1998 has been disclaimed.

[21] Appl. No.: 396,077

[22] Filed: Jul. 7, 1982

Related U.S. Application Data

[62] Division of Ser. No. 175,564, Aug. 6, 1980, Pat. No. 4,351,758.

[51] Int. Cl.$^3$ ............................................. C08L 67/02
[52] U.S. Cl. ................................... 524/227; 524/229; 524/424; 524/423; 524/451; 524/513; 524/539; 525/177; 525/444; 260/DIG. 24; 260/DIG. 35
[58] Field of Search ............... 524/227, 229, 492, 494, 524/424, 423, 451, 513, 539; 525/177, 444; 260/DIG. 24, DIG. 35; 264/328.1

[56] References Cited

U.S. PATENT DOCUMENTS

| | | | |
|---|---|---|---|
| 2,465,319 | 3/1949 | Whinfield et al. | 528/279 |
| 3,047,539 | 7/1962 | Pengilly | 528/285 |
| 3,547,872 | 12/1970 | Weissermel et al. | 260/40 |
| 3,565,852 | 2/1971 | Conix et al. | 260/40 |
| 3,578,623 | 5/1971 | Weissermel et al. | 260/40 |
| 3,624,041 | 11/1971 | Brandrup et al. | 260/75 M |
| 3,629,366 | 12/1971 | Brinkmann | 260/860 |
| 3,673,139 | 6/1972 | Hrach | 260/22 R |
| 3,673,144 | 6/1972 | Weissermel et al. | 260/30.4 R |
| 3,843,615 | 10/1974 | Herwig et al. | 525/444 |
| 3,889,039 | 6/1975 | Wainer | 428/404 |
| 3,953,394 | 4/1976 | Fox et al. | 525/444 |
| 3,965,064 | 6/1976 | Mercier et al. | 260/30.6 R |
| 4,016,112 | 4/1977 | Kajiura et al. | 260/2.5 N |
| 4,028,289 | 6/1977 | Brown | 260/2.5 N |
| 4,113,692 | 9/1978 | Wambach | 525/439 |
| 4,122,047 | 10/1978 | Filip et al. | 521/106 |
| 4,172,824 | 10/1979 | Harrington, Jr. et al. | 260/21.2 XA |
| 4,212,791 | 7/1980 | Avery et al. | 525/69 |
| 4,215,032 | 7/1980 | Kobayashi et al. | 525/437 |
| 4,220,735 | 9/1980 | Dieck et al. | 260/37 PC |

FOREIGN PATENT DOCUMENTS 2015014 9/1979 United Kingdom.

*Primary Examiner*—Theodore E. Pertilla
*Attorney, Agent, or Firm*—Burns, Doane, Swecker & Mathis

[57] ABSTRACT

Nucleating agents have been discovered which enable molded articles to be prepared with smooth glossy surfaces from blends of polyethylene terephthalate and polybutylene terephthalate in the "wet state", i.e., without the resin having been subjected to a predrying stage.

The present invention is directed to polyalkylene terephthalate resin compositions. Specifically, it is directed to undried blends of polyethylene terephthalate and polybutylene terephthalate resins with nucleating agents which enable these resin blends to be molded into articles with smooth glossy surfaces. In a preferred embodiment fillers and/or reinforcing materials are added without subjecting the resin to a predrying treatment which has been heretofore necessary in the prior art.

14 Claims, No Drawings

POLYESTER BLENDS

This is a division of application Ser. No. 175,564, filed Aug. 6, 1980, now U.S. Pat. No. 4,351,758.

BACKGROUND OF THE INVENTION

High molecular weight linear thermoplastic polyesters such as polyethylene terephthalate and poly(1,4-butylene terephthalate) are well known film, molded article and fiber formers prepared by methods outlined in Whinfield et al, U.S. Pat. No. 2,465,319 and Pengilly, U.S. Pat. No. 3,047,539 and elsewhere. Polyethylene terephthalate has not been greatly exploited as a molding and extrusion resin because it crystallizes so slowly from the melt that three-dimensional parts molded from it, in conventional molding cycles, are brittle in thick sections. The prior art has overcome, to some extent, this problem by providing careful molecular weight control in the production of polyethylene terephthalate; by including nucleating agents to hasten crystallization; or by using unconventional, long, two-step molding cycles.

In contrast, poly(1,4-butylene terephthalate) resins crystallize very rapidly from the melt. These provide excellent molding compositions because they can be fabricated with moderate stock temperatures, low mold temperatures and rapid cycle time. These resins can also be provided in reinforced and flame retardant embodiments. Because of their highly crystalline nature, these resins are superior in chemical resistance, thermal stability and product appearance (they have a smooth, glossy finish). Such resins also have superior strength, stiffness, low friction and wear properties and good resistance to brittle fracture. Because of their rapid crystallization times the poly(1,4-butylene terephthalate) resins do not need nucleating agents during the injection molding process.

One disadvantage of the poly(1,4-butylene terephthalate) resins resides in their significantly higher cost of manufacture in comparison with poly(ethylene terephthalate) due mainly to the higher cost of the raw materials employed in its manufacture.

The art has long recognized that when the above-discussed polyalkylene terephthalate resins are blended, i.e., when polyethylene terephthalate and polybutylene terephthalate resins are physically blended, a number of the above problems can be eliminated. For instance, when high levels of polybutylene terephthalate are utilized in the blend it is not necessary to use a nucleating agent. Alternatively, compositions which have higher ratios of polyethylene terephthalate to polybutylene terephthalate can be substantially improved by the use of nucleating agents.

British Pat. No. 1,060,401 discloses that, in addition to the above advantages, parts molded from the combination of the two polyalkylene terephthalates often show properties superior to those of either of the components in their pure stage.

One problem that has plagued the art, however, especially those compositions which contain any amount of polyethylene terephthalate and especially those that contain major proportions of polyethylene terephthalate, is the fact that these resin compositions must be thoroughly dried, i.e., free from as much moisture as possible, prior to being intimately admixed in an extruder and/or prior to a fabrication step. By fabrication is meant the melting, forming and solidification of an article from the resin composition. These drying operations often require special equipment and are expensive in terms of time and energy wasted. For example, U.S. Pat. No. 3,953,394, which discusses polyester blends, suggests that it is "always very important to thoroughly free all of the ingredients . . . from as much water as possible" and teaches typically that the resin should be predried "under vacuum at 100° C. for twelve hours". Typically, U.S. Pat. No. 3,619,367 to Weissermel et al which discloses the use of montan wax or montan wax ester as a nucleating agent in linear polyester compositions of terephthalic acid and saturated aliphatic or cycloaliphatic diols states that the polyester must have a moisture content of less than 0.01% by weight which necessitates a drying step prior to the nucleating agent addition.

SUMMARY OF THE INVENTION

It has now been discovered that articles can be formed from blends of polyethylene terephthalate and polybutylene terephthalate with smooth glossy surfaces even with additives, such as reinforcing agents and mineral fillers, without having to subject the resin(s) and/or resinous composition to a predrying operation. This is accomplished by the use of barium sulfate; talc; and selected alkali metal salts having anions which are oxides of the elements from Group IV of the Periodic Table, preferably alkali metal carbonates and bicarbonates such as sodium carbonate and bicarbonate as nucleating agents.

Articles molded from polyethylene terephthalate/polybutylene terephthalate blends have high gloss and high heat deflection temperatures when molded at temperatures below 110° C. without a precompounding and/or prefabricating drying step when the above-identified nucleating agents are utilized.

In accordance with the instant invention a process is provided which includes the steps of intimately admixing a blend of polyethylene terephthalate and polybutylene terephthalate present in a weight ratio in the range of between about 1:1 and 9:1 said blend of polyethylene terephthalate and polybutylene terephthalate present in a concentration in the ratio of between about 30% and 95% by weight, based on the total weight of the composition. The composition includes between about 4 and 65% by weight, based on the total weight of the composition of an additive selected from the group consisting of reinforcing agents; mineral fillers; and blends of reinforcing agents and mineral fillers. In addition, a nucleating agent, present in a concentration of between about 0.1 and 20% by weight, based on the total weight of the composition, said nucleating agent selected from the group consisting of alkali metal salts having anions which are oxides of the elements from Group IV of the Periodic Table; barium sulfate; and talc.

The process is characterized by the absence of a drying step prior to the intimate admixture of the constituents and/or the absence of a drying step prior to fabrication. That is, the resin composition immediately prior to being intimately admixed and/or fabricated has a moisture content exceeding 0.05% by weight based on the total weight of the compositions. Normally, under ambient conditions, moisture content of said compositions will not exceed about 0.4% by weight based on the total weight of the composition.

DESCRIPTION OF THE INVENTION

The polyalkylene terephthalate resins can be prepared by the teachings of Whinfield et al (U.S. Pat. No. 2,465,319) and Pengilly (U.S. Pat. No. 3,047,539). The polyalkylene terephthalate blend which includes polyethylene terephthalate and polybutylene terephthalate having a weight ratio in the range of between about 1:1 and 9:1, represents from about 30 to 95 percent by weight, based on the total weight of the resin composition. More preferably, the polyalkylene terephthalate blend comprises in the range of between about 40 and 90% by weight, and most preferably from about 45 to 85% by weight.

The polyalkylene terephthalates are characterized by an intrinsic viscosity of at least 0.2 and preferably about at least 0.4 deciliter/gram as measured by the relative viscosity of an 8% solution in orthochlorophenol at about 25° C. The upper limit is not critical but it generally does not exceed about 2.5 deciliters/gram. Especially preferred polyalkylene terephthalates are those with an intrinsic viscosity in the range of from about 0.4 to 1.3 deciliter/gram.

Although many of the additives selected from the group consisting of reinforcing fillers and mineral fillers known in the art can be utilized to improve the properties of the polyalkylene terephthalate compositions, the preferred additive is of the reinforcing filler. In general, any of the standard reinforcing fillers in the art can be used such as fibers, whiskers, etc. In a preferred embodiment of this invention, glass fibers are employed as the reinforcing filler.

The reinforcing fillers are present in a concentration in the range of between about 4 and 65% by weight based on the total weight of the resin composition. More preferably the reinforcing filler is present in a concentration of between about 10 and 55% by weight and especially preferable, a reinforcing agent level of from about 25 to 45% by weight, based on the total weight of the composition.

Prior art details of typical polyethylene terephthalate resin components; the polybutylene terephthalate resin components; reinforcing agents; flame retardants and drip suppressants which can be utilized in the instant invention are summarized in the Fox et al patent (U.S. Pat. No. 3,953,394) which is herein incorporated by reference in its entirety and should be considered part of this specification.

The nucleating agents of the instant invention which enable these resin blends to be intimately admixed and/or fabricated without having to be subjected to a pre-drying stage include monovalent metal salts whose anions are oxides of Group IV of the Periodic Table of the Elements, (DynaSlide Company, 1962), talc, and barium sulfate. These agents are present in a concentration in the range of between about 0.1 and 20%, more preferably between about 0.2 and 10%, and most preferably between about 0.3 and 5%, each by weight, based on the total weight of the composition.

The alkali metal cations useful as nucleating agents are those selected from the group consisting of lithium, sodium, potassium, rubidium and cesium, with the preferred cations being lithium, sodium and potassium and the most preferred, sodium.

The anions of the inorganic nucleating salts are the oxides of the elements selected from the group consisting of carbon, silicon, germanium, tin and lead with the preferred oxides being those of carbon and silicon. The most preferred are the carbon oxides such as the carbonate and bicarbonate anions.

In a preferred embodiment, the resin composition includes a mold release agent present in a concentration of from about 0.05 to 10% by weight, based on the total weight of the composition. More preferably, the mold release agent is present in a concentration in the range of between about 0.05 and 2% by weight based on the total weight of the composition. In a preferred embodiment, the mold release agent is N,N'-distearoylethylenediamine.

In still another preferred embodiment a plasticizer is provided in the resin composition. The plasticizer is present in a concentration of between about 0.1% and 20%, by weight based on the total weight of the composition. A preferred plasticizer for use in the resin composition is neopentylglycol dibenzoate.

It is a preferred feature of this invention also to provide flame retardant glass reinforced thermoplastic compositions because the polyesters are normally flammable. In this preferred embodiment, compositions are provided which also include a flame retardant additive in a minor proportion but in an amount at least sufficient to render the polyester resin non-burning or self-extinguishing.

Non-dripping embodiments are provided if the flame retardant compositions also include a polytetrafluoroethylene resin or a fumed colloidal silica in a minor proportion based on the composition but in an amount at least sufficient to render said polyester resin non-dripping when burning.

The following examples serve to illustrate the invention but they are not intended to limit it thereto.

EXAMPLE I

Polyethylene terephthalate having a moisture content of 0.58 to 0.68%, based on the total weight of the polyethylene terephthalate, was combined with polybutylene terephthalate having a moisture content of 0.47% based on the total weight of the polybutylene terephthalate. In addition, glass fibers were added to the polyethylene terephthalate and the polybutylene terephthalate. Finally, a nucleating agent calcium carbonate, having an average particle size of 0.07 micron was also combined with the above-recited ingredients.

All of the above constituents were intimately admixed in a 2½ inch Johnson single screw extruder maintained at a temperature which ranged between 490° F. and 530° F. The intimately admixed composition extruded out of the extruder was chopped into pellets. These pellets, with a moisture content no greater than about 0.4% by weight, were fed into a five ounce Reed injection molding machine maintained at a barrel temperature of 510° F. The composition was molded at temperature of 80° C. and 110° C.

Molded samples produced in accordance with the above procedure were tested to determine the Heat Deflection Temperature in °C. of the molded article. The test employed was ASTM test procedure D-648 run at 264 psi. As those skilled in the art are aware, the higher the heat deflection temperature, the better is the molded article for most end-use applications.

Additional molded samples, made in accordance with the above procedure, were tested to determine gloss. The test employed was ASTM standard test procedure D-2457. However, the ASTM test employs a plastic film. In this test, molded plaques, made in accordance with the above procedure, were used instead of plastic film. Otherwise, the test was exactly as described in ASTM D-2457. As those skilled in the art are aware, a gloss value of 15 or below is generally considered unacceptable. The higher the gloss value, the more attractive is the appearance of the shaped article.

The summary of this example is tabulated in the Table. The Table includes the percent by weight, based on the total weight of the composition of each constituent in the intimately admixed resin composition; the moisture content of the terephthalates; and the results of the heat deflection and gloss value tests.

bicarbonate instead of calcium carbonate. The results of this test are summarized in the Table.

TABLE

| Composition | Example IA | Example IIB | Example IIIC | Example IVD |
| --- | --- | --- | --- | --- |
| PET | 41.2% | 41.2 | 41.2 | 41.3 |
| PET | 27.4 | 27.4 | 27.4 | 27.5 |
| Glass Fibers | 31.0 | 31.0 | 31.0 | 31.0 |
| Nucleating Agent | 0.4 (CaCO3) | 0.4 (Talc) | 0.4 (NaHCO3) | — |
| N,N—distearoylethylene-diamine | — | — | — | 0.2 |

| Moisture Content | Example I | Example A | Example II | Example B | Example III | Example C | Example IV | Example D |
| --- | --- | --- | --- | --- | --- | --- | --- | --- |
| PET | .58–.68% | .01% | .58–.68% | .01% | .58–.68% | .01% | .5% | .08% |
| PET | .47% | .01–.02 | .47 | .01–.02 | .47 | .01–.02 | .5 | .08 |
| Heat Deflect Temp. | | | | | | | | |
| At 110° C. Mold Temp. | 205° C. | 182° C. | 207° C. | 196° C. | 196° C. | 200° C. | — | — |
| At 100° C. Mold Temp. | — | — | — | — | — | — | 60° C. | 190° C. |
| At 99° C. Mold Temp. | 201 | 70 | 204 | 200 | 183 | 177 | — | — |
| Gloss Value | | | | | | | | |
| At 110° C. Mold | <15 | 30 | 49 | 40 | 52 | 51 | — | — |
| At 90° C. Mold | 17 | <15 | 45 | 20 | 38 | 45 | — | — |

COMPARATIVE EXAMPLE A

Example I was repeated; the sole difference being the drying of the principle constituents in the resin composition, i.e., the polyethylene terephthalate and the polybutylene terephthalate. The constituents were placed in an oven maintained at a temperature ranging between 235° F. and 300° F. for about sixteen hours. The moisture content of these samples were then measured as in Example I. Molded articles were tested for heat deflection temperature and gloss value in accordance with the tests enumerated in Example I. The results of this example are reported in the Table.

EXAMPLE II

Example I was repeated in its entirety except for the identity of the nucleating agent. Whereas in Example I calcium carbonate was employed, in this example talc, having an average particle size of 2.7 micron, was blended with the polyethylene terephthalate, polybutylene terephthalate and glass fibers. The results of this test are summarized in the Table.

COMPARATIVE EXAMPLE B

Example II was repeated in its entirety except that the polyethylene terephthalate and the polybutylene terephthalate resins were dried in accordance with the procedure enumerated in Comparative Example A. The results of this test are summarized in the Table.

EXAMPLE III

Example I was repeated in its entirety but for the substitution of sodium bicarbonate, instead of calcium carbonate, as the nucleating agent. The results of this test appear in the Table.

COMPARATIVE EXAMPLE C

Comparative Example A was repeated in its entirety except that the nucleating agent employed was sodium

EXAMPLE IV

Example I was repeated in its entirety except that the nucleating agent calcium carbonate was omitted from the ingredients introduced into the extruder. Thus, in this example no nucleating or plasticizing agent was present in the intimately admixed composition. The results of Example IV is summarized in the Table.

COMPARATIVE EXAMPLE D

Example IV was reproduced in its entirety except that the polyethylene terephthalate and polybutylene terephthalate were both predried in accordance with the procedure enumerated in Comparative Example A. A summary of Comparative Example D is provided in the Table.

DISCUSSION

Example I and Comparative Example A both establish the non-operability of calcium carbonate as a nucleating agent in cold molds. At a mold temperature of 90° C., the gloss value is marginally acceptable, being at a relatively low value of 17. At 110° C. mold temperature, the gloss value is totally unacceptable, below 15.

Example II illustrates the applicability of talc as a nucleating agent in blends of polyethylene terephthalate and polybutylene terephthalate. Employing the same concentration of talc as was employed in calcium carbonate, 0.4% by weight based on the total weight of the composition, molded articles having acceptable gloss and heat deflection temperature were obtained.

Comparative Example B illustrates that drying the composition does not improve gloss or heat deflection temperature.

The same effect noted in Example II is generally found in Example III. This example illustrates the applicability of sodium bicarbonate as a nucleating agent. Comparative Example C demonstrates that a drying step, that is, imposing a low moisture level in the composition prior to intimately admixing is not required. In general, the results obtained for sodium bicarbonate with or without drying are approximately the same with regard to both heat deflection temperature and gloss value.

Example IV and Comparative Example D illustrate that when polyethylene terephthalate resin is present in high loadings, a drying step is essential in the absence of the nucleating agents of this invention for heat deflection temperature is totally unacceptable when the compositions are undried.

In conclusion, the above examples indicate that even with "cold" mold conditions, i.e., 110° C. or less, the use of the nucleating agents of the instant invention in the resin blends of this invention are able to produce molded articles having highly glossed surfaces using the resin(s) and/or resin composition "as is", i.e., without having to subject the resin(s) prior to intimately admixing and/or the resin compositions prior to fabricating to a predrying stage. This discovery is of tremendous economic importance and has not been heretofore known to exist in the art.

What we claim is:

1. A thermoplastic polyester molding composition, comprising an intimate admixture of:
    (a) a blend of polyethylene terephthalate and polybutylene terephthalate in a weight ratio of from about 1:1 to about 9:1, respectively; and
    (b) from about 0.1 to about 20% by weight of the total composition of a nucleating agent selected from the group consisting of sodium carbonate, potassium carbonate, sodium bicarbonate, potassium bicarbonate, and mixtures thereof.

2. The composition of claim 1, wherein said nucleating agent comprises from about 0.2 to about 10% by weight of the total composition.

3. The composition of claim 2, wherein said nucleating agent comprises from about 0.3 to about 5% by weight of the total composition.

4. The composition of any one of claims 1-3, wherein said composition further comprises from about 0.05 to about 10% by weight of a mold release agent.

5. The composition of claim 4, wherein said mold release agent is N,N'-distearoylethylenediamine.

6. The composition of any one of claims 1-3, wherein said composition further comprises a plasticizer in an amount of from about 0.1 to about 20 percent by weight of the total composition.

7. The composition of any one of claims 1-3, wherein said composition further comprises a flame retardant additive in a minor proportion but in an amount at least sufficient to render said composition non-burning or self-extinguishing.

8. The composition of any one of claims 1-3, wherein said composition further comprises a polytetrafluoroethylene resin or a fumed colloidal silica in a minor proportion based on said composition, but in an amount at least sufficient to render said composition non-dripping when burning.

9. The composition of any one of claims 1-3, wherein said composition further contains an additive selected from the group consisting of reinforcing agents, mineral fillers and mixtures thereof in an amount of from about 4 to about 65% by weight of the total composition, said blend of polyethylene terephthalate and polybutylene terephthalate comprising from about 40 to about 95% by weight of the composition.

10. The composition of claim 9, wherein said additive is glass fiber.

11. A thermoplastic polyester molding composition, comprising an intimate admixture of:
    (a) a blend of polyethylene terephthalate and polybutylene terephthalate in a weight ratio of from about 1:1 to about 9:1, respectively;
    (b) from about 0.1 to about 20% by weight of the total composition of a nucleating agent selected from the group consisting of potassium carbonate, potassium bicarbonate, sodium carbonate, sodium bicarbonate, and mixtures thereof;
    (c) a flame retardant additive in a minor amount but in an amount at least sufficient to render said composition non-burning or self-extinguishing; and
    (d) a polytetrafluoroethylene resin or a fumed colloidal silica drip suppressant in a minor proportion but in an amount at least sufficient to render said composition non-dripping when burning.

12. The composition of claim 11, wherein said nucleating agent comprises from about 0.2 to about 10% by weight of the total composition.

13. The composition of claim 11, wherein said nucleating agent comprises from about 0.3 to about 5% by weight of the total composition.

14. The composition of any one of claims 11-13, further comprising from about 0.05 to about 10% by weight of a mold release agent.

* * * * *